United States Patent [19]

Stoll

[11] Patent Number: 4,722,744
[45] Date of Patent: Feb. 2, 1988

[54] CONDENSATE TRAP
[76] Inventor: Kurt Stoll, Lenzhalde 72, D-7300 Esslingen, Fed. Rep. of Germany
[21] Appl. No.: 913,747
[22] Filed: Sep. 30, 1986
[30] Foreign Application Priority Data Oct. 1, 1985 [DE] Fed. Rep. of Germany ....... 3534932

[51] Int. Cl.$^4$ ............................................. B01D 45/04
[52] U.S. Cl. ........................................ 55/219; 55/319; 55/DIG. 17; 137/192; 137/433
[58] Field of Search ................. 55/165, 169, 219, 319, 55/DIG. 17; 137/192, 199, 202, 430, 433

[56] References Cited
U.S. PATENT DOCUMENTS

| | | | |
|---|---|---|---|
| 1,897,492 | 2/1933 | Ledoux | 137/433 |
| 2,428,045 | 9/1947 | Sharp et al. | 55/165 |
| 2,871,875 | 2/1959 | Dale | 137/433 |
| 2,972,412 | 2/1961 | Lundeen | 137/192 |
| 3,358,790 | 12/1967 | Krudewig | 55/219 X |

OTHER PUBLICATIONS

Beckett-Harcum Company Catalog ALC #10 M, "Pneumatic Components," p. 3, 12-65.
Wilkerson Corporation Data Sheet #1200-001-01, 7-69, "Microalescer" Filters.

Primary Examiner—Charles Hart
Attorney, Agent, or Firm—McGlew and Tuttle

[57] ABSTRACT

The invention relates to a condensate trap for compressed air plant. There is a sealing member arranged inside a trap housing. The sealing member also has the function of a float moving up and down with the level of condensate trapped in the housing. In its lowered position the sealing member shuts off a lateral discharge port and in a raised position it uncovers it. There are cam surfaces for guiding the sealing member and float so as to center it on the port.

14 Claims, 5 Drawing Figures

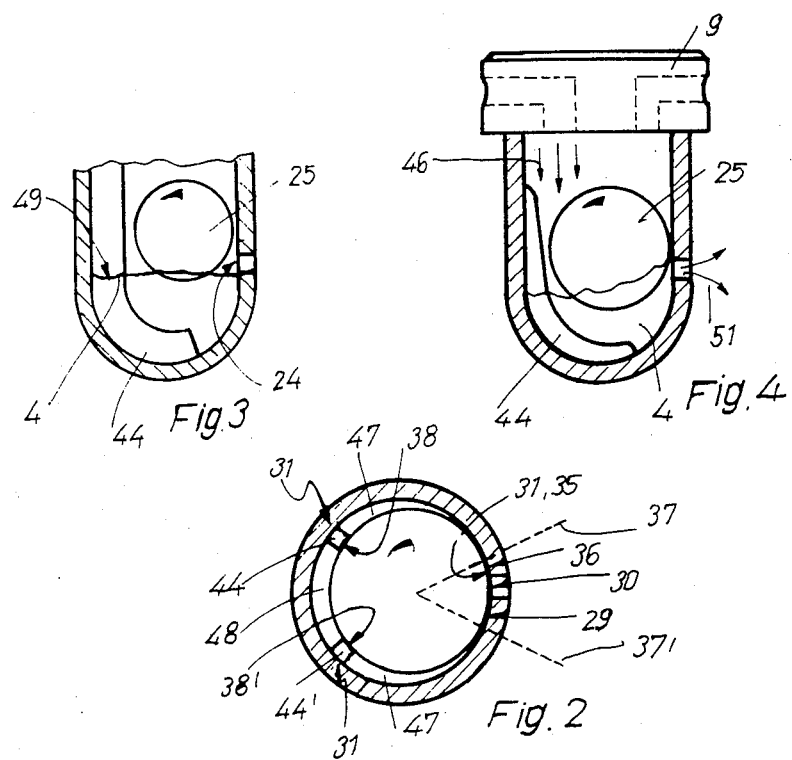
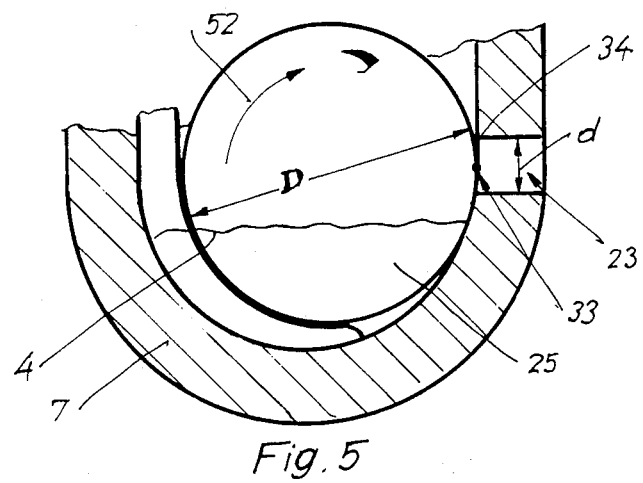

CONDENSATE TRAP

BACKGROUND OF THE INVENTION

The invention relates to a device for separating liquids such as condensate, from gas under pressures such as compressed air, and more specifically to a condensate trap, which is adapted to be connected with a duct so that such gas may flow from one section of the duct, through the device and then back into a further section of the duct, and comprises a liquid trapping housing with a discharge port leading out of the interior of the housing into the surroundings, a valve for covering over and uncovering the port for the discharge of liquid trapped in the housing into the surroundings, such valve comprising a valve member that is able to be moved between a first switching position in which it shuts off the port and a second switching position in which it clears the port and thus puts the interior of the housing in communication with the surroundings, a float which is arranged in the interior of the housing so that it is able to be moved upwards and downwards to a greater or lesser extent in accordance with the amount of liquid in the housing, and is connected with the valve member at least part of whose surface completely shuts off the discharge port in a lowered position of the float and opens the port when the float is in lifted, floating positions.

Such a device or trap, which is used to clear entrained liquids such as condensed water from compressed gas, and more especially from compressed air, has been proposed in the German gebrauchsmuster patent No. 7,036,144, in which case the valve is mounted externally at the bottom of the liquid trapping housing and there is a valve chamber associated with the discharge port. The valve member is placed in the chamber. In its first switching position the valve member is urged by a spring against a valve seat so that the discharge port is shut off. Furthermore the valve member is mechanically linked with a drive piston, whose one piston surface is supplied with driving pressure via a duct. This drive duct leads into the interior of the liquid trapping housing and to a pilot valve, which is shut in the resting, inactive position of the float and is opened in a certain floating position of the float. In the event of the level of the trapped liquid reaching a given height in the interior of the liquid trapping housing, the pilot valve will open and the drive piston will be acted upon by the pressure effective in the interior of the housing so that it is shifted against the force of the return spring and this leads to upward motion of the valve member clear of its seat so that the discharge port is opened. Because some of the liquid is now able to leave the housing, its level therein will be lowered so that the float moves downwards and this in turn leads to closing of the pilot valve and the shutting of the discharge port again.

This known device is made up of a large number of components and has to be generally complex in structure and design in order to ensure proper operation. As a result the device is very expensive to manufacture and highly prone to get out of order when in operation. To take an example, the pilot duct is very liable to foul up so that the operation of the valve member is impaired.

SHORT SUMMARY OF THE PRESENT INVENTION

One object of the present invention is to devise a condensate trap, or more broadly, a device for clearing entrained liquid from a gas under pressure, which has an extremely simple structure.

A further aim of the invention is to provide such a device that is economic to produce.

As a still further objective, the invention is intended to make it possible for such a device to be more reliable in operation.

In order to achieve these or other objects appearing herein, the valve consists essentially of a valve member placed loosely in the interior of the liquid trapping housing, such valve member being formed by the float and being combined therewith in the form of an actuating and sealing member which is guided when moving downwards into its inactive or resting position by cam means in the interior of the housing so that its sealing surface completely covers over the discharge port in the said inactive position and produces a sealing effect.

The advantage of the device in keeping with the invention is to be more especially seen in the reduction of the number of its components, it being possible for the valve to consist merely of the actuating and sealing member, which is able to cooperate with the discharge port. There is practically no wear and the device is practically free of any malfunction, since the lifting of the float causes the opening of the discharge port without the use of any separate intermediate parts.

The cross section of the discharge opening may be made relatively large so that the danger of its becoming clogged and fouled is relatively slight. The device in keeping with the invention functions very reliably and there is the advantage that no means is needed to urge the actuating member in its resting position on the port and only one means is needed to urge the actuating and sealing member against the port opening in its inactive position. In fact, it is the pressure obtianing within the interior of the liquid trapping housing which serves to press the sealing surface of the member onto the port, and it is only the direction of such pressing by the member which is influenced by the cam means. Preferably the actuating and sealing member is made in a spherical form, its outer surface then constituting the sealing surface. If this spherical member rests on the port opening, the surface will make flush engagement on all sides and the port will be shut off on all sides. Preferably the port is furthermore placed to the side of the housing so that as the actuating and sealing member moves upwards the discharge port will be gradually uncovered; in this respect it is possible for the actuating and sealing member to roll on the inner wall surface of the housing. Such an arrangement improves the response behavior of the valve system considerably while at the same time greatly reducing the actuating force needed to open the port opening. This is because the force pressing the actuating and sealing member in this case onto the opening transverse in relation to the direction of lifting of the member and not exactly opposite thereto. Furthermore the actuating and sealing member is preferably securely located in its inactive position by the cam or guide surfaces of the cam means so that a stable sealing condition is assured. On the other hand it is legitimate for the actuating and sealing member to be arranged with play in the cam means in the conditions in which it floats and, more particularly, it may be arranged so that it may turn freely. This feature leads to the advantage that the member may be readily moved between its different, discrete positions to and fro; at the same time it is then possible to ensure that on clearing the discharge port, compressed air or other gas under pressure will sweep past it and this will shift it towards the housing wall having the port therein so that, in the zone between the lower face of the member and the discharge port, a suction effect will be caused by capillary action which will scavenge the condensate and will expel it towards and through the discharge port. There will be a further advantage in this respect if one of the cam surfaces of the cam system is placed directly on the inner face of the liquid trapping housing adjacent to the port and above it while at an opposite position there will be a space between the spherical member and the inner surface of the housing. Such intermediate space will enable the gas under pressure to sweep past the actuating and sealing member. Once the motion of the gas etc. has commenced, the trapped condensate is be expelled from the discharge port at the same rate as it collects in the liquid trapping housing. It is furthermore an advantage if the liquid trapping housing is made integrally with all the cam surfaces such as cam ribs so that production will be simple and may even be possible in a single operation, as for example by casting.

Further advantageous features of the invention are specified in the claims.

The following more detailed account is devoted to one possible working example of the device in keeping with the invention, reference being had to the accompanying drawings.

LIST OF THE SEVERAL FIGURES OF THE DRAWINGS

FIG. 2 is a section through the device of FIG. 1 taken on the line II—II of FIG. 1.

FIG. 3 is a view of part of the device of figures with the actuating and sealing member in its floating position and with the trapped condensate at its highest level.

FIG. 4 shows the expulsion of the liquid.

FIG. 5 is a view on a larger scale of the device of FIG. 1 to show the actuating and sealing member in its inactive setting.

DETAILED DESCRIPTION OF WORKING EMBODIMENT OF THE INVENTION

Figure 1:
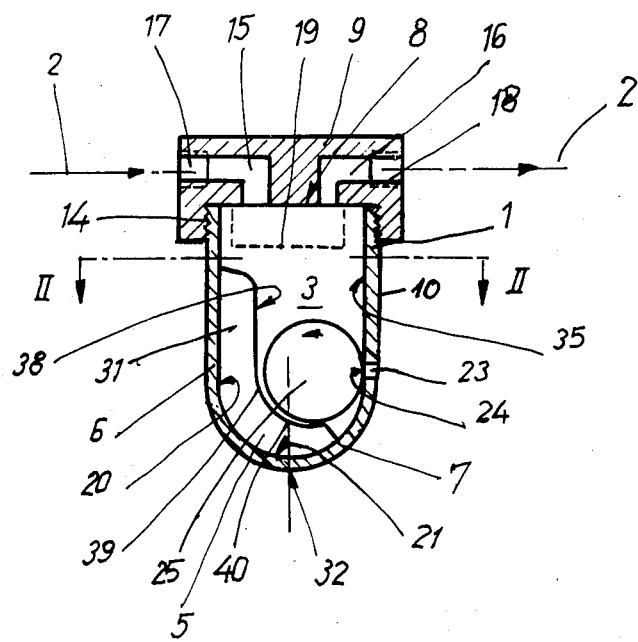
FIG. 1 is a longitudinal section of a first embodiment of the device in keeping with the invention with the actuating and sealing member in its inactive or resting position.

The present invention relates to a device for the separation of liquids from a gas under pressure and more specifically to a trap for removing condensate from compressed air. To this end the device is placed on a compressed gas line (denoted in broken lines at 2), i.e. so connected that gas flowing along the line is diverted into the device, flows through it and then flows back into a further section of the line. The device possesses a liquid trapping housing 1 through which the gas under pressure passes. As the gas moves through the liquid trapping housing 1 the entrained condensate 4 is deposited in the interior 3 and collects adjacent to the floor 5 of the interior 3 at.

In the working example the liquid trapping housing 1 is constructed so as to be divided into two parts in such a way that its side walls 6 and its floor part 7 constitute a bell-like component, whose otherwise open top end 8 is shut off by a lid or connector cover 9 in a gas tight manner.

The connector cover 9 is preferably releasably screwed onto the lower part 10 made up of the side walls 6 and the floor part 7 and for this purpose the lower part 10 has a thread 14 on its outer circumferential surface in the vicinity of the top end 8. The connector cover 9 is then screwed onto this by means of a mating female thread. The connecting cover 9 has two connection ducts 15 and 16 extending through it which each have one end opening into the interior 3 and at the outer side of the connecting cover 9. One of the outer ports of the ducts is the inlet 17 for the gas and the other port is the outlet 18 for the gas; it is adapted to be connected to the gas pressure line 2.

Accordingly the gas under pressed flows via the gas inlet 17 and the connection duct 15 into the interior 3 of the liquid trapping housing 1, where it gives up its condensate and then passes out of the liquid trapping housing via the connecting duct 16 and the gas outlet 18. It is possible to have a filter means 19, indicated in broken lines, adjoining the outlets of the connection ducts 15 and 16 so that this will present an additional way of liberating the gas under pressure from impurities.

In the working example shown the side wall 6 has a circularly cylindrical inner form 20 or surface and the inner surface 21 of the floor part 7 facing into the interior of the liquid trapping housing is in the form of part of a spherical surface, that is to say, curved in three dimensions. The radius of this part of a spherical surface is in the present case equal to the internal diameter of the circularly cylindrical form 20 so that the two internal surfaces merge smoothly into each other. It is convenient if the external form of the lower part 10 is designed so as to correspond to the inner form of the lower part 10 since this will tend to simplify manufacture. It is furthermore preferred for the lower part 10 to have a U-like longitudinal section as taken along the longitudinal axis 22 extending from the floor part 7 to the connecting cover 9.

At one point thereof the lower part 10 has a discharge port 23 running through it so as to be in communication at one end with the surroundings and the interior 3 (passage 24). The discharge port 23 makes it possible for the condensate trapped in the housing to be removed therefrom.

The passage 24 may cooperate with an actuating and sealing member 25 located in the interior 3 of the housing, which takes the form of a float and a valve member and which is capable of performing the two functions performed by such members separately. Thus the actuating and sealing member 25 functions on the one hand in the manner of the valve member of a valve and is able to be moved between a first switching position in which it shuts off the discharge port 23, and a second switching position, in which it is clear of the discharge port 23. However, on the other hand this member also functions as a float or buoyant member, which assumes a position at a greater or lesser distance from the floor part 7 in keeping with the amount of condensate deposited and trapped in the housing. In accordance with the present invention these two functions are combined in one and the same component (i.e. the actuating and sealing member 25) in such a way that in a lowered and inactive position (FIG. 1), that is to say when there is a relatively low level, the actuating and sealing member 25 entirely shuts off the discharge port 23, whereas in a position in which it is shifted out of this inactive positions, that is to say when it is raised, (FIGS. 3 and 4) the actuating and sealing member 25 partly or completely comes clear of the port 23.

When the discharge port 23 is shut off in the inactive position of the actuating and sealing member 25 a sealing surface 29 on the actuating and sealing member comes into place. This sealing surface is so designed that in the inactive positions it obturates the passage 24 with at least part 30 of its surface.

The actuating and sealing member 25 is loosely placed in the interior 3 of the housing and there is therefore a cam means 31, which guides the actuating and sealing member 25 when it moves downwards into its inactive position and guides it towards the passage 24 connected from the discharge port 23 so that one may be certain that in the inactive setting of the actuating and sealing member 25 the port sill be completely shut off with a gas-tight sealing effect. The closing force or the force pressing the member 25 so that its sealing surface 29 is urged towards the passage 24, is exclusively supplied by the internal pressure obtaining in the interior 3 of the housing and which is due to the gas under pressure with which it is filled.

It will be readily appreciated that the device in accordance with the invention is functionally very reliable owing to the small number of components, of which the actuating and sealing member 25 is a multi-function component. Owing to the choice of the material and the configuration of the actuating and sealing member 25, it is possible for its maximum depth of penetration into the trapped condensate 4 to be preset so that the time at which the passage 24 is at least partly uncovered may be readily adjusted. For if the level of the condensate 4 reaches a distance above the floor part 7 at which at the same time the member 25 is so far immersed in the liquid 4 that its weight and the upthrust force are in equilibrium, the time will have been come at which the actuating and sealing member 25 will be shifted out of its inactive position and it will float. Accordingly, at the same time the part 30 of the sealing surface 29 will be moved clear of the passage 24 and the trapped liquid 4 is able to move out into the surroundings.

Basically there are two possibilities as regards the location of the passage 24. It may either be provided on the floor part 7 or, however, in the side wall 6 of the lower part 10. There is also the possibility of arranging the passage 24 exactly aligned with the apex 32 of the ball as marked by the line or at a greater or lesser distance to the side of this. In this respect it may be generally remarked that the greater the correspondence between the imaginary plane containing the passage 24 and an arrangement which is parallel to the longitudinal axis 22, the more satisfactory the arrangement of the passage 24. The reason for this is related to the fact that the upthrust force acting on the actuating and sealing member 25 is always directed vertically upwards, that is to say in the present embodiment in the direction of the longitudinal axis 22, whereas the closing force exerted by the compressed gas on the actuating and sealing member 25 will always be towards the passage 24, that is to say in the axial direction thereof. The effort required to clear the sealing surface 29 of the member 25 from the passage 24 therefore always involves the greatest force, if the closing force and the upthrust force are exactly opposing, as is in fact the case in the present instance in which the passage is at the apex 32. A further consideration here is that the actuating and sealing member 25 will be acted upon by substantially the same pressure above and below if the passage 24 is arranged at the side so that even a small upthrust force will be sufficient to move the actuating and sealing member 25 upwards. Furthermore in the case of an arrangement of the passage 24 in the vicinity of the apex 32 a certain retaining force would have to be overridden so that the passage 24 would be abruptly opened, and this in turn would lead to a substantial jerk of the actuating and sealing member 25 out of position. An abrupt or jerky opening of the passage 24 would be accompanied by a heavy pressure fluctuation in the interior of the housing and this would hardly be in line with the desire of bringing about an even and regular deposition of condensate therein.

It may therefore be said that an arrangement of the passage 24 to the side in relation to the inactive position of the actuating and sealing member 25 would require a smaller upthrust force to clear the discharge port 23 and at the same time there would be an optimum response behavior of the actuating and sealing member 25. In such a case there would be the advantage that the dislodging or lifting of the actuating and sealing member 25 would take place with a smaller amount of liquid so that during operation of the device in keeping with the invention only a smaller amount of condensate liquid would remain in the liquid trapping housing.

It is for this reason that the passage 24 is arranged in the side wall 6 and in the adjacent part of the part-spherical floor part 7 in the working example of the invention. The upward motion of the actuating and sealing member 25 from its inactive position does not in this case involve an abrupt or sudden opening of the passage 24 but rather a gradual or continuous one, something that leads to the advantages as described above.

In the present embodiment the design is such that the sealing surface 29 on the actuating and sealing member 25 is curved or vaulted and is more especially convex so that at least this part is a part-spherical surface. Preferably, however, the sealing surface 29 is a complete spherical surface as constituted by the outer surface of the actuating and sealing member 25, said member being in fact in the form of a spherical body for this purpose. The outcome of this is that the part 30, covering the passage 24, of the sealing surface 29 extends to a slight degree into the discharge port 23 (FIG. 5) when the central part 33 of the sealing surface is covering the port and this ensures that the sealing surface makes contact with the edge 34 of the passage 24 with a sealing effect. Furthermore there is a centering effect so that the actuating and sealing member 25 is securely located in its inactive position.

In order to ensure that the condensate liquid 4 separating from the gas under pressure is in fact able to reach the floor part 5 under the actuating and sealing member 25, the internal diameter of the lower part 10 as measured in the longitudinal direction is greater in the vicinity of the side wall 6 than the diameter of the spherical actuating and sealing member 25. In order yet to be able to exactly guide the member towards the passage 24, the above-mentioned guide cam means 31 is provided in the interior 3 of the housing. This cam means has a plurality of cam surfaces, along which the actuating and sealing member 25 is able to slide and/or roll as it moves upwards and downwards. It will be clear that these surfaces are respectively arranged so as to be turned towards the actuating and sealing member 25.

A first one 35 of these cam surfaces is formed on the part of the housing inner surface or form 20 arranged above the passage 24 and is in fact formed by a section of this part. The longitudinal direction of this first cam surface runs parallel to the longitudinal axis 22 and as seen in FIG. 2 has an arcuate shape which is concave in relation to the member 25. The length as measured transversely in relation to the longitudinal axis 22, or in the present case the arcuate length of this first cam surface 35, is defined by the section of abutment of the actuating and sealing member 25 thereon. For since the actuating and sealing member 25 has a smaller radius of curvature than the inner form 20, as seen in the plan view of FIG. 2, it will only have an arcuate section of its outer face resting on the inner form 20; the length of this arc of contact 36 will be equal to the breadth of the first cam or guide surface 35. In FIG. 2 this section is delimited by two imaginary radiuses 37 and 37' at its sides, which are marked in broken lines. The first cam surface 35 thus has the form of a segment of the surface of a cylinder.

There are also further, second cam surfaces 38 and 38', which as seen in cross section as in FIG. 2 are arranged on the side which is opposite to the actuating and sealing member 25. That is to say, the actuating and sealing member 25 is placed between the first and second cam surfaces 35, 38 and 38'. On the one hand they also extend in the longitudinal direction of the housing 1, but in this respect are somewhat oblique in relation to the longitudinal axis 22, same running away from the connecting cover 9 towards the floor part 7 and towards the longitudinal axis 22. Their transverse shape is also preferably adapted to the shape or outline of the spherical actuating and sealing member 25, the breadth however being comparatively small so that the second cam surfaces may also be flat in the direction across the longitudinal direction thereof.

As seen in the longitudinal direction a part 40 with an arcuate form adjoins the flat or plane straight parts 39 (which run at an oblique angle) of the second cam surfaces 38 and 38' generally at the same level as the passage 24 towards the floor part 7. The radius of curvature of this part 40 is preferably equal to that of the spherical surface of the actuating and sealing member 25. These arcuate parts 40 locate the actuating and sealing member 25 in its inactive state, in which they make contact with the side of the actuating and sealing member 25 and on the other hand extend under it.

Preferably there are two cam surfaces 38 and 38', which are respectively arranged on the cam ribs 44 and 44', which are on the inner wall surface of the lower part 10 and are more especially made integrally therewith. These ribs project radially inwards for the inner wall surface and their rib sides which are also turned radially inwards constitute the second cam surfaces 38 and 38'.

As seen in the cross section of FIG. 2, the cam ribs 44 and 44' are distributed around the outer periphery of the actuating and sealing member 35 with a spacing between them so that starting with the first cam surface 35 they are respectively opposite to it generally in a secant direction. This means that the actuating and sealing member 25 is guided at three separate points of its horizontal circumference by the cam surfaces 35, 38 and 38'. The longitudinal directions of all cam surfaces arranged at a higher level than the passage 24 are, as seen in cross section in keeping with FIG. 2, generally at an angle of 120° to each other about the longitudinal axis 22.

Since the second cam or guide surfaces are formed on the cam ribs 44 and 44' it is possible to ensure that the actuating and sealing member 25 does not make contact anywhere on the inner wall face of the lower part 10 with the exception of the first cam surface 35. The consequence of this is that the separated condensate may move around and under the actuating and sealing member 25 in an optimum fashion at all times, this being a prerequisite for functional reliability of the device in accordance with the invention.

The ensuing account is devoted to a description of the operation of the device in accordance with the invention:

At the commencement of condensate trapping operation, the spherical actuating and sealing member 25 will be in its inactive or resting position so that a part 30 of its sealing surface will be obturating the passage 24 and at the same time the actuating and sealing member 25 will be in contact with the two second cam surfaces 38 and 38' at the arcuate part 40. The condensate trapped as the gas flows through the interior of the housing moves downwards as indicated by the arrows 46 in FIG. 4 towards the floor part 5 of the liquid trapping housing 1 and is able to move past the actuating and sealing member 25 at the three clearances 47, 47' and 48. These clearances are respectively defined by the inner form 20 of the side wall 6 and the opposite outer surface or sealing surface 29 of the actuating and sealing member 25 and are separated from each other by the two cam ribs 44 and 44' and by the part in which the actuating and sealing member 25 runs on the first cam surface 5. Once the trapped condensate 4 has reached a level which involves sufficient upthrust on the member 25 to dislodge it from its inactive position, the actuating and sealing member 25 will be lifted and will float, and at the same time the part 30 of the sealing surface will gradually and smoothly uncover the passage 24. The upthrust force needed for dislodging the member 25 is very small, since the second cam surfaces 38 and 38' extend away from the first cam surface 35 with an increasing distance from the floor part 7 so that there is not the least chance of the actuating and sealing member 25 jamming between the cam surfaces. In this respect it is possible for the sealing surface 29 of the actuating and sealing member 25 to roll on the cam surface 35 during upward motion so that it is possible for the central part 33 of the sealing surface 29 to move clear of the interior of the discharge port 23.

Even while the opening of the passage 24 is still taking place, it is possible for liquid to leave through the discharge port 23 provided that the level before the opening of the port was higher than the lower limit thereof. Once the discharge port 23 is more or less uncovered, the liquid 4 will flow out of the liquid trapping housing until the level 49 of the liquid has reached the lower limit of the passage 24 (see FIG. 3). With the member 25 in its floating condition up to this point in time the member 25 will be clear of the cam surfaces around it and accordingly will be able to turn freely. A further factor is that gas under pressure will emerge from the discharge port 23 which is now open and this gas will flow past the actuating and sealing member 25 in the clearances 47, 47' and 48 and will leave through the discharge port 23. This flow will displace the actuating and sealing member 28 towards the first cam surface 35 and there will be a suction effect under the member adjacent to the passage 24 owing to capillary action so that the water will be entrained and expelled out through the discharge port 23. Consequently the level of the liquid will sink further until the passage 24 is obturated by the member 25 again. After this the whole procedure will be repeated.

It will be clear that the passage may also be formed with a valve seat and/or may be provided with a sealing ring placed round it in order to ensure a perfect sealing action on making contact with the part 30 of the sealing surface. Furthermore, the actuating and sealing member 25 is not limited to one in the form of a ball and in fact the member 25 may be in the form of a cylinder if the liquid trapping housing is suitably designed. The outer face of the cylindrical actuating and sealing member 25 would then form the sealing surface. It is clear that in this case the longitudinal axis of the cylinder would be at a right angle to the longitudinal axis 22.

A short account will now be given to explain the main features of the invention. The present device ensures automatic draining of the trapped condensate using a member functioning as a float and an actuating and sealing means in order to produce a suction effect drawing off the liquid to the outside through the discharge port. It is an advantage that during this operation the internal pressure in the interior 3 of the housing remains substantially constant. In the present invention it is not necessary to have complex valve means and lever linkages so that the design is simple and practically free of wear. Furthermore, a minimum force is needed in order to move the actuating and sealing member 25 upwards, this being an advantage having regard to the laterally arranged port so that the latter may have a relatively large diameter and there is no problem as regards blockage (it would be less satisfactory to have a port with a large cross section under the actuating and sealing member 25 since then a very large upthrust would be required in order to lift the sealing surface clear of the port).

Thus while gas under pressure moves in through the duct 15, through the liquid trapping housing 1 and out through the duct 16, condensate will collect at the floor part 5 of the housing 1 so that the passage 24 will slowly be opened and the trapped water will gradually be released. In this respect the level may be predetermined. The cam ribs 44 and 44' guide and direct the actuating and sealing member 25 towards the passage 24 when the water goes below a given level and the passage is uncovered. If one the other hand the level rises the spherical member 25 will start to rotate as described and will expel condensed water pari passu with the access of liquid into the interior of the housing. Furthermore in the uncovered state of the passage 24 liquid will escape through te discharge port 23 so that there will be a suction effect owing to capillary action and an additional expulsion of condensate from the housing.

It is further to be noted with reference to FIG. 5 that the diameter D of the actuating and sealing member 25 preferably bears such a relation to the diameter d of the passage 24 that the rolling motion of the member 25 on rising out of its resting state as marked by arrow 52 is first in the central part 33.

I claim:

1. A device for the separation of liquids, particularly condensate, from compressed gas such as compressed air, comprising a collecting box into which the compressed gas flows used to hold liquids separated from the gas, said box having a wall with a drain opening for the liquid, based above the bottom of said box, a movable float valve member located in said collecting box for closing the drain opening and releasing the opening when floating, a float valve guide device in said box including a curved surface for guiding said float valve member towards the drain opening when said float member drops as it floats into a closed position at the bottom of said collecting box said collecting box having a wall in the immediate vicinity of the drain opening which is curved cylindrically and more gently than the surface of said float member and forms a first guide surface for the said float member above the drain opening, and a second guide surface for the float member located substantially diametrically opposite the said first guide surface in a secant direction relative to said float member and having guide ribs projecting into the interior of said box with a space in between.

2. A device according to claim 1 wherein said guide ribs define guide surfaces which are arranged substantially parallel to one another in the area of said box of above said drain opening.

3. A device according to claim 2 wherein said guide surfaces depart continuously upwardly from the said first guide surface, said box having a bottom which extends in an opposite direction from said ribs forming said guide surfaces, said first and second guide surfaces running conically towards one another both said bottom and wherein said valve member in its closed position rest against the parts of said guide surfaces and have a clearance with said guide surfaces in its floating position.

4. A device according to claim 1 wherein there are two guide ribs that are arranged in longitudinal direction of said box and which when viewed in a rising and falling direction of said float along its circumference at a distance from one another, in such a way that the float is guided at three points distributed around the circumference of said float member.

5. A device according to claim 1 wherein said float member in a closed position is surrounded on its bottom side by parts of said first and second guide surfaces and said float member rest on said guide surfaces with these parts preferably having a shape matching the contour of said float member.

6. A device according to claim 5 wherein guide ribs and guide surfaces having a curved shaped conforming to the contour of said float member.

7. A device according to claim 1 wherein said collecting box has a top cover sealing a bottom portion thereof. Said cover having a circular cylindrical contour in the area of said side wall and an internal contour at the bottom of said box having a spherical cap shape with a larger radius of curvature than said float.

8. A device according to claim 7 wherein said drain has opening located on a side wall of said box, said collecting box wall having a transition between the substantially straight vertical wall and a conically formed bottom wall at the location of said opening.

9. A device according to claim 8 wherein drain opening is located so that it is opened at said float valve member floated above said opening which allows the compressed gas to flow with condensate through the drain orifice to produce a suction within the interior of said box and additionally entrains condensate.

10. A device according to claim 1 wherein said drain opening forms a valve seat in said box and including a gasket seal encircling said valve seat.

11. A device according to claim 1 wherein said float valve member comprises a ball shaped member having a diameter slightly smaller than the interior diameter of said box and when it is floated downwardly with a dropping of the level of the condensate, it can rest on said guide surface with the guide surface including spaced apart rib members having lower anguous curve and support said float valve member.

12. A device according to claim 11 wherein said valve member has a sealing surface which rolls off the surface of said box and is located so as to close said drain orifice which said valve member rests on the surface of said box.

13. A device according to claim 1 wherein said sealing surface of said float valve member such that when said valve member is floated, a condensate reaching the level of said drain is in a position at opening of said drain.

14. A device according to claim 1 wherein said float valve member is of a ball-shaped configuration and when it is lifted out of a position closing said drain opening is positioned with free mobility above the drain opening.

* * * * *